(12) United States Patent
Holmgren (10) Patent No.: US 9,243,735 B2
(45) Date of Patent: Jan. 26, 2016

(54) FLOW LIMITER AND USE OF A FLOW LIMITER IN AN AIR DISTRIBUTION SYSTEM OF AN AIR CONDITIONING SYSTEM OF AN AIRCRAFT

(75) Inventor: Joakim Holmgren, Hamburg (DE)

(73) Assignee: Airbus Operations GmbH (DE)

( * ) Notice: Subject to any disclaimer, the term of this patent is extended or adjusted under 35 U.S.C. 154(b) by 369 days.

(21) Appl. No.: 13/331,006

(22) Filed: Dec. 20, 2011

(65) Prior Publication Data

US 2012/0118408 A1    May 17, 2012

Related U.S. Application Data

(63) Continuation of application No. PCT/EP2010/058070, filed on Jun. 9, 2010.

(60) Provisional application No. 61/219,074, filed on Jun. 22, 2009.

(30) Foreign Application Priority Data

Jun. 22, 2009  (DE) .......................... 10 2009 029 875

(51) Int. Cl.
```
F24F 13/08      (2006.01)
F16L 55/027     (2006.01)
B64D 13/00      (2006.01)
F16L 55/033     (2006.01)
F24F 13/24      (2006.01)
```

(52) U.S. Cl.
CPC ........... *F16L 55/02709* (2013.01); *B64D 13/00* (2013.01); *F16L 55/02754* (2013.01); *F16L 55/0331* (2013.01); *F24F 13/08* (2013.01); *F24F 13/24* (2013.01); *Y10T 137/8376* (2015.04)

(58) Field of Classification Search
CPC . B64D 13/00; B64D 2013/003; F24F 11/047; F24F 13/06; F24F 13/105; F24F 13/08; F16L 55/02709
USPC ............................................. 454/76, 275, 289
See application file for complete search history.

(56) References Cited

U.S. PATENT DOCUMENTS

| | | | | |
|---|---|---|---|---|
| 1,536,891 A | * | 5/1925 | Langlois ........................ 454/289 |
| 1,849,623 A | * | 3/1932 | Herwig, Jr. ................... 48/180.1 |
| 2,443,071 A | * | 6/1948 | Honerkamp et al. ....... 137/625.3 |
| 2,916,101 A | * | 12/1959 | Naman ........................... 181/224 |
| 3,354,986 A | * | 11/1967 | Griffin et al. ................ 181/269 |

(Continued)

FOREIGN PATENT DOCUMENTS

| | | |
|---|---|---|
| BE | 492645 A | 12/1949 |
| DE | 867333 C | 2/1953 |

(Continued)

*Primary Examiner* — Steven B McAllister
*Assistant Examiner* — Jonathan Cotov
(74) *Attorney, Agent, or Firm* — Lerner, David, Littenberg, Krumholz & Mentlik, LLP (57) ABSTRACT

A flow limiter comprises a line segment with an air inlet and an air outlet and at least one resistance element. The resistance element is positioned within the line segment and impresses a predetermined flow resistance on an air flow that extends from the air inlet to the air outlet. Preferably, the resistance element extends at least in part in an axial direction of the line segment. Such a flow limiter is used to adjust an air volume flow and comprises particularly low generation of intrinsic noise.

10 Claims, 5 Drawing Sheets

(56) References Cited

U.S. PATENT DOCUMENTS

| | | | | |
|---|---|---|---|---|
| 3,403,852 A | * | 10/1968 | Gorchev | 236/13 |
| 3,763,884 A | * | 10/1973 | Grassi et al. | 137/504 |
| 3,776,365 A | * | 12/1973 | Richards | 181/256 |
| 3,894,610 A | * | 7/1975 | Halter et al. | 181/256 |
| 4,073,832 A | * | 2/1978 | McGann | 261/118 |
| 4,313,721 A | * | 2/1982 | Henriques | 431/265 |
| 4,516,606 A | * | 5/1985 | Worley | 137/625.3 |
| 4,750,087 A | * | 6/1988 | Carpenter et al. | 361/690 |
| 5,399,120 A | * | 3/1995 | Burns et al. | 454/126 |
| 5,435,781 A | * | 7/1995 | Kitchens | F24F 13/08 454/284 |
| 5,935,490 A | * | 8/1999 | Archbold et al. | 261/76 |
| 6,139,423 A | * | 10/2000 | Wadey | 454/142 |
| 6,752,712 B1 | * | 6/2004 | Short et al. | 454/76 |
| 6,991,177 B2 | * | 1/2006 | George | 236/49.3 |
| 7,185,736 B2 | * | 3/2007 | McCarty | 181/224 |
| 7,232,369 B2 | * | 6/2007 | Karidis et al. | 454/274 |
| 7,841,930 B2 | * | 11/2010 | Rimmer et al. | 454/290 |
| 8,303,384 B2 | * | 11/2012 | Krakowski et al. | 454/76 |
| 8,517,051 B2 | * | 8/2013 | Fazekas et al. | 137/517 |
| 8,539,784 B2 | * | 9/2013 | Heuer et al. | 62/186 |
| 2002/0162589 A1 | * | 11/2002 | Lorch et al. | 137/517 |
| 2005/0051382 A1 | * | 3/2005 | Borgmeier | 181/252 |
| 2008/0156385 A1 | | 7/2008 | Treimer et al. | |
| 2008/0182505 A1 | * | 7/2008 | Oosterhuis | 454/290 |

FOREIGN PATENT DOCUMENTS

| | | | |
|---|---|---|---|
| DE | 884154 | C | 7/1953 |
| DE | 1842581 | U | 11/1961 |
| DE | 19501981 | * | 7/1996 |
| DE | 19501981 | A1 | 7/1996 |
| DE | 19647424 | A1 | 7/1997 |
| DE | 20314134 | U1 | 1/2005 |
| DE | 102004009041 | * | 8/2005 |
| DE | 102004009041 | B3 | 8/2005 |
| DE | 10200410009041 | * | 8/2005 |
| DE | 102007001052 | A1 | 7/2008 |
| EP | 1063479 | A2 | 12/2000 |
| FR | 2857431 | A1 | 1/2005 |
| GB | 354476 | A | 8/1931 |

* cited by examiner

FLOW LIMITER AND USE OF A FLOW LIMITER IN AN AIR DISTRIBUTION SYSTEM OF AN AIR CONDITIONING SYSTEM OF AN AIRCRAFT

CROSS-REFERENCE TO RELATED APPLICATIONS

This application is a continuation of International Application No. PCT/EP2010/058070, filed Jun. 9, 2010, which claims the benefit of the filing date of U.S. Provisional Patent Application No. 61/219,074, filed 22 Jun. 22, 2009 and of German Patent Application No. 10 2009 029 875.4, filed Jun. 22, 2009, the entire disclosures of which are hereby incorporated herein by reference.

TECHNICAL FIELD OF THE INVENTION

The invention relates to a flow limiter, to the use of a flow limiter in an air distribution system of an air conditioning system of an aircraft, and to an aircraft with at least one air conditioning system, at least one air distribution system, and at least one flow limiter according to the invention.

BACKGROUND TO THE INVENTION

In a multitude of air distribution systems flow limiters are used in order to, starting with an inlet air pressure, cause a desired air volume flow. In the design of an air distribution system a multitude of air lines are connected to a pressure source, and individual flow limiters with different flow resistance parameters adjust the desired air volume flows into the air lines.

Usually, such flow limiters are realised in the form of air line segments in which an aperture plate is integrated through which a certain flow resistance is generated. Because of the abrupt change in cross section, in the region around the aperture opening turbulent flow fields occur which furthermore surround a strongly directional air jet. This results in turbulent flow sound, which in view of the multitude of flow limiters used in complex air distribution systems, for example in vehicles, is perceived by passengers to be a noise nuisance. Moreover, the turbulence level behind an aperture is problematical, because downstream line components, e.g. air outlets, cause more noise with turbulent inflow than with turbulence-free inflow. In order to reduce the noise generated by a conventional flow limiter, usually additional sound absorbers are arranged downstream of the aperture. As a result of this a flow limiter becomes quite heavy and, furthermore, extends further outwards in radial direction than the actual air line so that as a result of this the integration of air lines, for example in vehicles where there is limited installation space, is rendered more difficult.

SUMMARY OF THE INVENTION

It may thus be the object of the invention to propose a flow limiter which is associated with the lowest possible noise generation, the lowest possible turbulence level, while being of a compact design.

This object is met by a flow limiter as stated in the first independent claim.

A flow limiter according to the invention comprises a line segment with an air inlet and an air outlet. The external dimensions of this line segment may correspond to those of the air line whose volume flow is to be adjusted by the flow limiter. The line segment may comprise a round, for example a circular, an angular or some other cross section, with said cross section not limiting the scope of the invention.

The flow limiter according to the invention further comprises at least one resistance element that is positioned within the line segment. This resistance element imposes a predetermined flow resistance on an air flow that extends from the air inlet to the air outlet. To significantly improve the orderly flow through the resistance element, the latter could, at least in part, extend in an axial direction of the line segment. In this arrangement it is immaterial as to whether the extension is upstream or downstream or, for example, in some regions downstream and upstream.

In an advantageous improvement of the flow limiter according to the invention, the resistance element is at least in some regions perforated. Perforation, at least in some regions, of a resistance element provides a significant advantage in that as a result of a multitude of perforation openings no central and strongly directional air jet arises that is surrounded by turbulent flow fields. Instead, depending on the selection of the size and number of the perforation openings, a more orderly air flow is to be expected in which the turbulent portion is kept within narrow limits, and thus noise generation in the imposing of the flow resistance is reduced.

As a result of an extension of the resistance element in axial direction the area of the resistance element subjected to through-flow is increased so that, for example, a larger number of perforation openings is possible, wherein the diameters of the perforation openings can be selected to be smaller.

In an advantageous embodiment the resistance element could comprise at least in part a curvature. This makes possible very easy manufacture, for example when the resistance element is made from a thin piece of sheet metal and the curvature can be produced by simple deep drawing or the like.

In an advantageous embodiment of the flow limiter according to the invention a significant increase in the area of the resistance element subjected to through-flow is obtained by selecting a conical shape that determines at least part of the shape of the resistance element. This conical shape may, for example, extend downstream within the line segment; at the same time it could be of a symmetrical design and comprise a rounded tip. However, the flow limiter according to the invention is not limited to this; instead, depending on the external shape of the line segment, asymmetric shapes of the resistance element could also be selected, and, furthermore, the tip of the conical shape need not be rounded. The conical shape is particularly well suited to minimizing the level of turbulence of the flow behind the resistance element.

In a further advantageous embodiment of the flow limiter according to the invention the resistance element or the line segment resistance element comprises a radial air-impermeable region which, starting from an outer radial boundary, extends to an inner radial boundary perpendicularly to the direction of flow. For example in a circular cross section of the line segment this means that the resistance element could comprise a circular ring that is characterized by an outer radial boundary and an inner radial boundary. By selecting these radial boundaries of the air-impermeable region of the resistance element, already a certain pressure differential can be built up by way of the resistance element, while turbulence arising in this air-impermeable region is mitigated or dissipated as a result of the subsequent design shape according to the invention. The air-impermeable region can also be implemented by an aperture with a relatively large opening, which aperture is arranged on the line segment.

Thus in a particularly advantageous embodiment of the flow limiter according to the invention the outer radial boundary of the air-impermeable region of the resistance element extends to the inside of the line segment, while the inner radial boundary of this region, for example, follows on from a conical shape or a curvature. Since in this following shape particularly advantageously all-over material is used that only comprises perforation openings, with a corresponding selection of the inner radial boundary, turbulent flow will impinge on this location, and will gently be channeled downstream.

In a particularly advantageous embodiment of the flow limiter according to the invention, in addition, downstream of the resistance element an absorber material in the form of an absorber is positioned, which absorber material attenuates any remaining turbulence that extends in an outer radial region, thus also attenuating the associated noise generation. For the purpose of attenuating any noise generation, a short distance between the perforation openings and the absorber is advantageous.

In an advantageous embodiment of the flow limiter according to the invention the absorber material extends from the inside of the line segment to the inner radial boundary of the resistance element, which, as already explained above, in this region is air-impermeable. In this manner influencing the air flow emanating from the resistance element can be limited in a targeted manner, wherein only turbulent radially-outward extending flow components or sound components are attenuated by the absorber material.

In a preferred embodiment of the flow limiter according to the invention it is furthermore advantageous if the radial extension of the absorber material in the direction of flow decreases at least in one region. For example, the thickness of the absorber material could be reduced in the direction of flow so that the absorber material peters out from the inner radial boundary towards the outside.

It is particularly preferred if the diameter and number of the perforation openings of the resistance element are selected in such a manner that they taper off towards the center axis of the line segment. The reason for this is that with resistance elements extending in axial direction there is a tendency for the air pressure to increase in radial direction towards the center axis of the line segment, which can be compensated for by reduced diameters of the perforation openings so that the radial pressure field behind the resistance element is equalized. This also counteracts noise generation.

For improved adjustment of the desired flow resistance the resistance element can optionally be covered at least in some regions by a covering element so that the number of the available perforation openings is reduced and thus the flow resistance is increased.

In a particularly advantageous improvement of the flow limiter according to the invention the axial position of said flow limiter can be adjusted by means of an axial adjustment element so that, for example, the space to an air-impermeable region, to edges of an absorber, or the like, can be adjusted.

To the person skilled in the art it is obvious that a flow limiter according to the invention does not have to comprise only one single resistance element, but instead can also comprise several such resistance elements. Furthermore, it is also imaginable for several resistance elements to be combined so that, for example, a first resistance element extends from the inside of the line segment to the center axis of the line segment, and is supplemented by a second resistance element, with a shorter radial extension, in such a manner that the second resistance element is placed on the first resistance element.

The object is further met by the use of such flow limiters according to the invention in an air distribution system of an air conditioning system of an aircraft, and by an aircraft with at least one air conditioning system and at least one air distribution system. The air lines can harmonically be designed with integrated flow limiters so that they are not only easy to route but also cause very low noise generation.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION OF EXEMPLARY EMBODIMENTS

Figure 1:
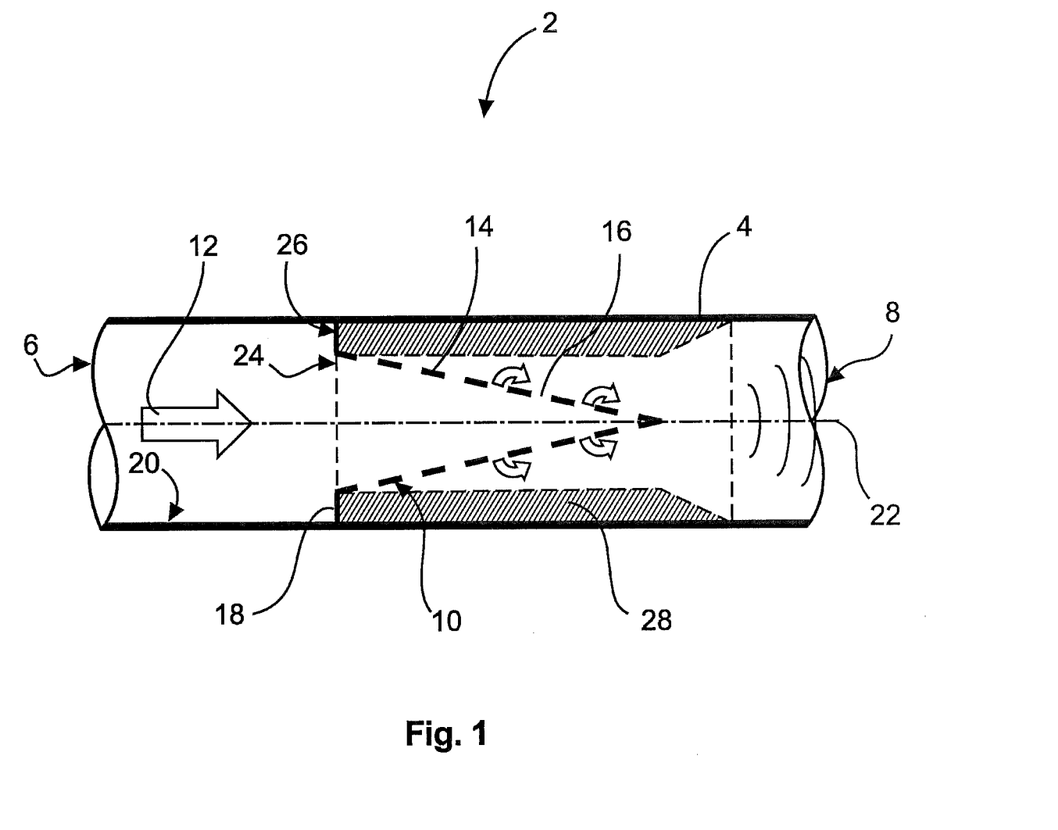
FIG. 1 shows a diagrammatic view of the flow limiter according to the invention in a lateral sectional view.

FIG. 1 shows a flow limiter 2 according to the invention, which flow limiter 2 comprises a line segment 4 with an air inlet 6 and an air outlet 8. Within the line segment 4 a resistance element 10 is arranged which extends in the direction of flow 12 in axial direction of the line segment 4. As an example, the resistance element 10 comprises a conical region 14 that comprises a number of perforation openings 16. Through the perforation openings 16 flowing air can move from the air inlet 6 to the air outlet 8, wherein by means of a relatively large number of perforation openings 16 a particularly harmonic flow pattern with little noise generation can be produced.

The resistance element 10 further comprises an air-impermeable region 18 that is arranged so as to be perpendicular to the direction of flow 12 and that extends from the inside 20 of the line segment 4 in the direction of the center axis 22 of the flow limiter 2 according to the invention. In this manner, in the case of a circular cross section of the line segment 4 a circular screen region is created which causes part of the pressure differential of the through-flowing air. Any turbulence arising on an inner boundary 24 of the air-impermeable region 18 is significantly attenuated by the subsequent conical region 14, and consequently any noise generation is counteracted. The air-impermeable region 18 further comprises an outer radial boundary 26 that finishes off with the inside 20 of the line segment 4.

Furthermore, within the flow limiter 2 according to the invention there is an absorber 28 that extends from the outer radial boundary 26 or from the inside 20 of the line segment 4 to the inner radial boundary 24 of the resistance element 10 and extends downstream from the resistance element 10. As an example, the thickness of the absorber 28 remains constant along the resistance element 10 and is subsequently reduced until the absorber 28 tapers off completely against the inside 20 of the line segment 4. A stepped finish would generate turbulence and noise. At this point it should be mentioned that the thickness of the absorber 28 need not remain constant, but to achieve stronger attenuation of various frequencies can also be designed so as to be variable. The air-impermeable region 18 can be used as a radial delimitation for the absorber 28 so that the air flow on the absorber is harmonic.

The absorber 28 is used to reduce any noise arising from turbulent components of the airflow flowing through the perforation openings 16. Said absorber 28 is equally suited to reducing all the noise that has already arisen before this, for example noise emanating from a fan arranged upstream.

The flow limiter 2 according to the invention is thus in a position to generate as little noise as possible in the imposing of flow resistance on an air flow. This reduced noise generation is further reduced with the use of an absorber, and as a result of the advantageous design it is not necessary for the region of the flow limiter 2 to have a radially larger extension than that of an incoming or outgoing air line.

Figure 2:
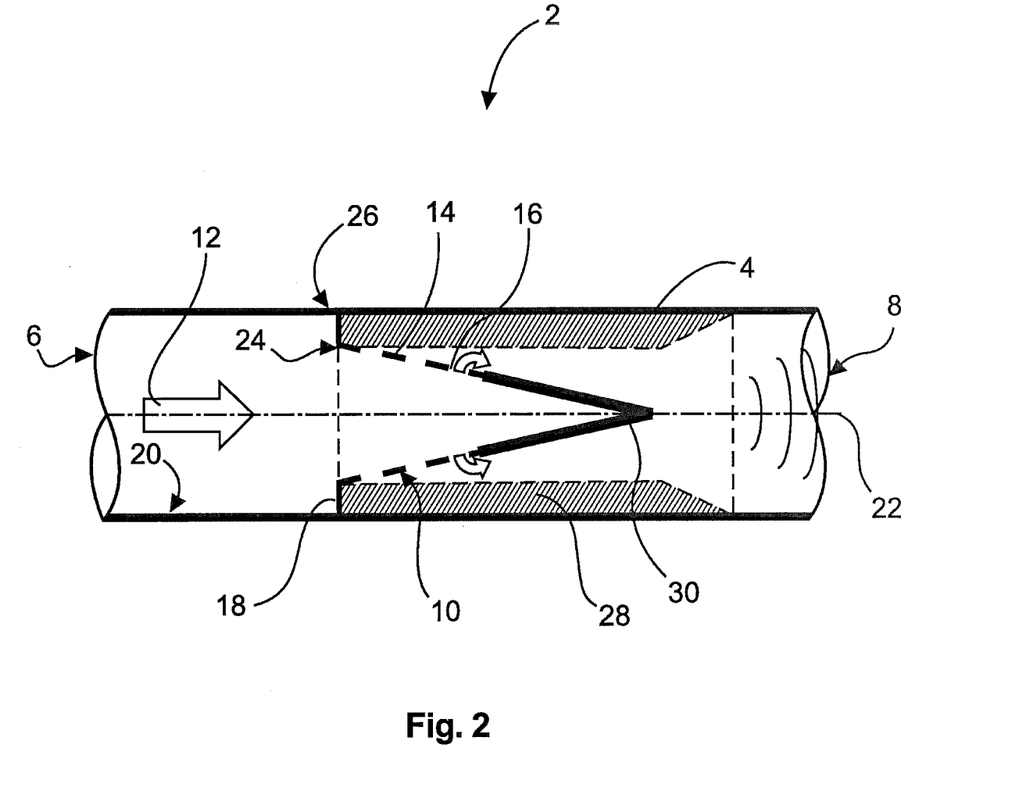
FIG. 2 shows a diagrammatic view of the flow limiter according to the invention with the covering element in place in a lateral sectional view.

FIG. 2 shows a modification of the flow limiter according to the invention in which an additional covering element 30 has been placed on the conical region 14 of the resistance element 10. This is used to close off some perforation openings 16, and thus to calibrate the flow limiter 2 according to the invention. This is advantageous in particular in those cases where a larger air distribution system is constructed, and standardized series-production flow limiters 2 according to the invention need to be provided. Calibration of the air distribution system can then be undertaken by adapting corresponding covering elements 30. For this purpose it would be possible, for example, to use a likewise standardized thin-walled component comprising an elastic plastic material, which can easily be cut to size with scissors and consequently can easily be adapted in order to, finally, be bonded onto the resistance element 10.

At this point it should be emphasized that in order to increase the pressure differential it is also possible to reduce the interior diameter of the air-impermeable region so that it is smaller than the interior diameter of the absorber 28.

Figure 3:
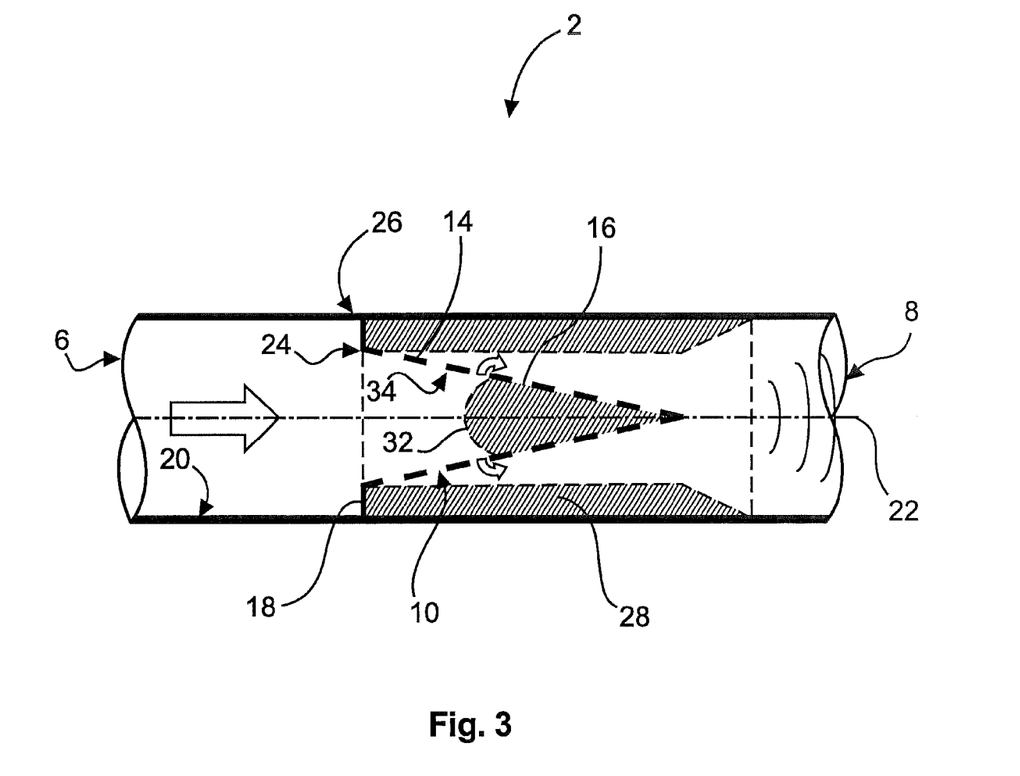
FIG. 3 shows a diagrammatic view of a flow limiter according to the invention with two combined resistance elements in a lateral sectional view.

FIG. 3 shows an additional exemplary embodiment in which likewise a resistance element 10 in the form of a conical region 14 with an outer air-impermeable region 18 is implemented. However, the exemplary embodiment shown in FIG. 3 is characterized in that a second resistance element 32 is used, which also comprises perforation, and which has been applied to an inside 34 of the conical regions 14 of the resistance element 10. This is used to further increase the generated pressure differential and thus the flow resistance, while at the same time the design of the flow limiter 2 according to the invention is kept compact.

Figure 4A:
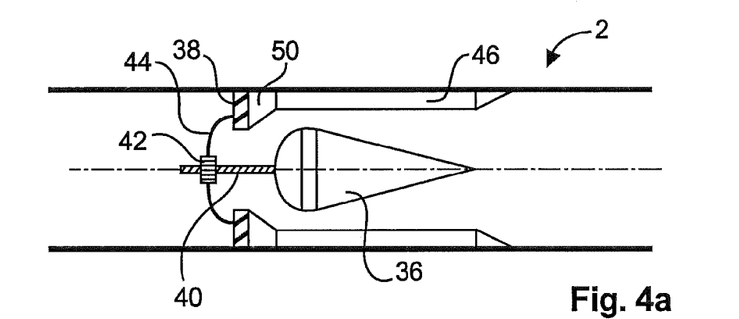
FIGS. 4a to 4d show further exemplary embodiments of a flow limiter according to the invention in lateral sectional views.
Figure 4B:
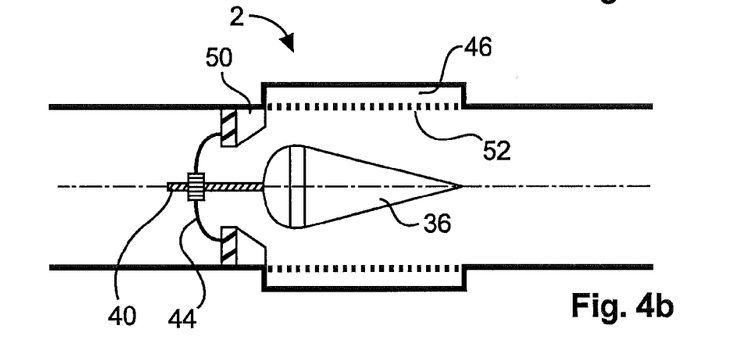
Figure 4C:
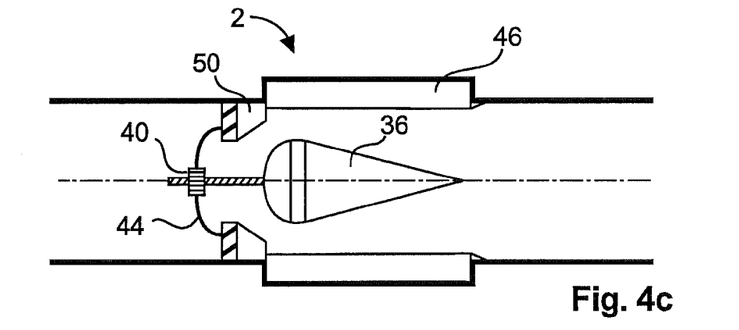
Figure 4D:
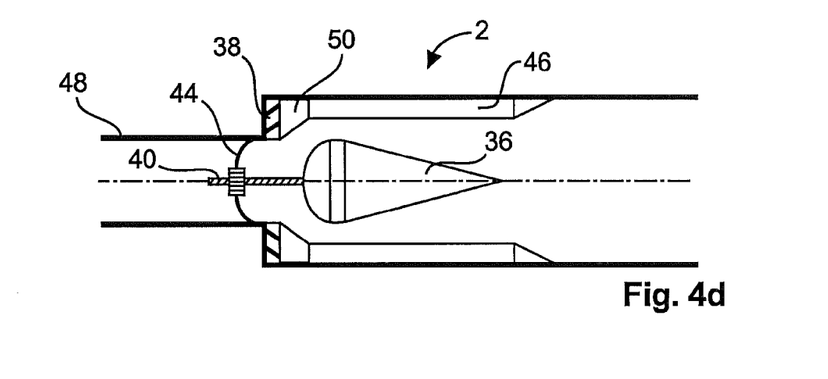

FIGS. 4a to 4d show modifications of the flow limiter 2 according to the invention with a flow-optimized resistance element 36 and optionally a aperture 38 arranged upstream of the aforesaid. FIG. 4d shows that an inflow line 48 can comprise a diameter that is significantly smaller than the diameter of the flow limiter according to the invention. On its inflowing or upstream side the resistance element 36 comprises an axial adjustment mechanism in the form of a threaded rod 40 that engages a threaded nut 42, wherein the threaded nut 42 is supported by the aperture 38 or by the inflow line 48. The support can be provided, for example, by a cross-shaped body 44 that is well air-permeable. The axial adjustment mechanism is used to adjust the axial position of the resistance element 36 relative to the aperture 38 or to the inflow line 48 so that in this manner the achievable differential pressure is adjusted.

Furthermore, the flow limiter 2 according to the invention comprises an absorber 46 that comprises a continuous shape or a shape that is variable in longitudinal direction so that for example the radial extension of the absorber 46 from the aperture 38 to behind the resistance element 36 changes gradually or in steps. For example, an area 50 that is arranged in the region of the aperture 38 or of the inflow line 48 and that points to the resistance element 36 could be in the shape of a conical section so that a flow channel that is as continuous as possible is formed between the resistance element 36 and the absorber 46. In this arrangement the distance between the upstream facing area of the resistance element 36 and the area 50 of the absorber 46 is decisively responsible for the set pressure differential.

The absorber 46 can radially extend further than the line segment 4, as is shown in FIGS. 4b and 4c. In this arrangement the area of the absorber 46, which area faces the resistance element 36, can be delimited by a perforated cover 52. It should be pointed out that this modification shown in FIGS. 4a to 4d can also be implemented without an absorber 46, and that also a resistance element 10 or 32, shown in FIGS. 1 to 3, can comprise an axial adjustment mechanism.

These modifications provide special advantages in that the pressure loss can be adjusted in an infinitely variable manner, in that the flow profile is very harmonic, and in that the absorber is located so as to be very close to the noise sources, and consequently the dimensions between the rear part of the resistance element 36 and the absorber 46 are very small and result in favorable acoustic reflections.

The resistance elements 32 and 36 can be designed so as to be acoustically non-absorbent, i.e. reflecting sound, or as absorbers.

Figure 5:
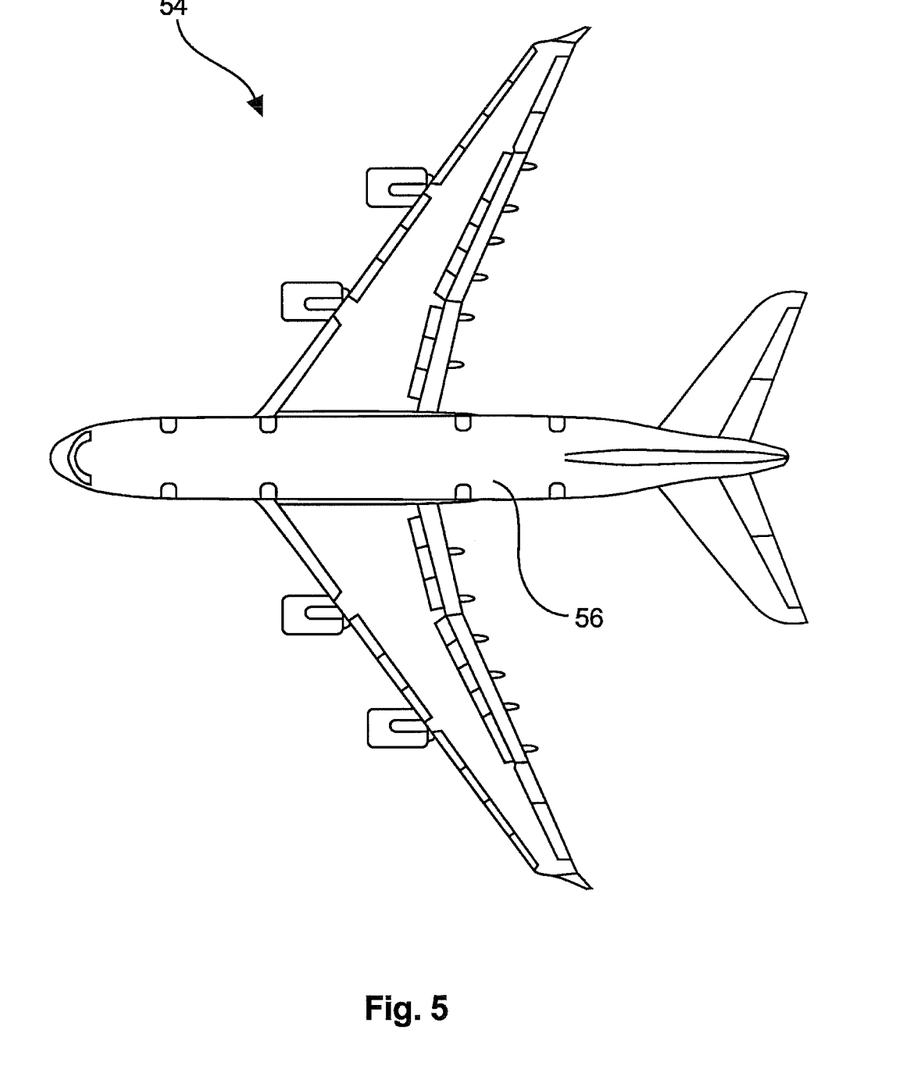
FIG. 5 shows a top view of an aircraft with an air conditioning unit and an air distribution system with at least one flow limiter according to the invention.

Finally, FIG. 5 shows an aircraft 54 in which usually a very extensive air distribution system is used in order to supply air to various air conditioning zones in the fuselage 56 of the aircraft. To make it possible to provide constant air supply to all the regions of the fuselage 56, numerous flow limiters 2 according to the invention are to be incorporated in the air distribution system to be used, which flow limiters 2, in particular with regard to their use in an aircraft 54, provide the special advantage of very low noise generation.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

2 Flow limiter
4 Line segment
6 Air inlet
8 Air outlet
10 Resistance element
12 Direction of flow
14 Conical region of the resistance element
16 Perforation opening
18 Air-impermeable region
20 Inside of the line segment
22 Center axis of the line segment
24 Inner radial boundary
26 Outer radial boundary
28 Absorber
30 Covering element
32 Resistance element 34 Inside of the conical region of the resistance element
36 Resistance element
38 Aperture
40 Threaded rod
42 Threaded nut
44 Body
46 Absorber
48 Inflow line
50 Area
52 Perforated cover
54 Aircraft
56 Fuselage

The invention claimed is:

1. A flow limiter, comprising
a line segment with an air inlet and an air outlet;
at least one resistance element, which resistance element is at least in some regions perforated so as to comprise a plurality of openings and at least in part comprises a curvature, a conical shape or the shape of a conical section;
at least one absorber; and
an air-impermeable covering element for covering some of the plurality of perforation openings while leaving the remaining perforations open for calibrating the flow resistance of the flow limiter, said covering element having a shape adapted to the shape of the resistance element,
wherein the resistance element is positioned within the line segment and imposes a predetermined flow resistance on an air flow that extends from the air inlet to the air outlet;
wherein the absorber is positioned downstream of the resistance element in the line segment.

2. The flow limiter of claim 1, wherein by way of an axial adjustment device the axial position of the resistance element is adjustable relative to a fixed reference point.

3. The flow limiter of claim 1, wherein the resistance element or the line segment comprises a radial air-impermeable region which, starting from an outer radial boundary, extends to an inner radial boundary perpendicular to the direction of flow.

4. The flow limiter of claim 3, wherein the outer radial boundary of the air-impermeable region of the resistance element extends to the inside of the line segment.

5. The flow limiter of claim 3, wherein the absorber extends from the inside of the line segment to the inner radial boundary of the resistance element.

6. The flow limiter of claim 5, wherein the radial extension of the absorber in the direction of flow decreases at least in one region.

7. The flow limiter of claim 1, wherein the diameters of perforation openings of the resistance element increase towards a center axis of the line segment.

8. The flow limiter of claim 1, comprising two or more resistance elements.

9. The flow limiter of claim 8, wherein the two or more resistance elements comprise different radial extensions and are arranged concentrically to each other.

10. An aircraft with at least one air conditioning system, at least one cabin to be air conditioned, and at least one air distribution system for distributing air from the air conditioning system to the cabin;
wherein air lines of the air distribution system comprise a flow limiter comprising:
a line segment with an air inlet and an air outlet;
at least one resistance element perforated at least in some regions so as to comprise a plurality of openings and comprising at least in part a curvature, a conical shape or the shape of a conical section;
a covering element for covering some of the plurality of perforation openings while leaving the remaining perforations open for calibrating the flow resistance of the flow limiter, said covering element having a shape adapted to the shape of the resistance element, said covering element attached to the at least one resistance element and configured to prevent exit of a fluid from the some of the plurality of perforation openings; and
at least one absorber;
wherein the resistance element is positioned within the line segment;
wherein the resistance element extends at least in part in an axial direction of the line segment, and impresses a predetermined flow resistance on an air flow that extends from the air inlet to the air outlet;
wherein the absorber is positioned downstream of the resistance element in the line segment.

\* \* \* \* \*